May 16, 1939.                G. RAYMOND                2,158,381
                          METERING APPARATUS
                          Filed Nov. 9, 1936            4 Sheets-Sheet 1

INVENTOR
Gwynne Raymond.
BY
ATTORNEY

May 16, 1939.   G. RAYMOND   2,158,381
METERING APPARATUS
Filed Nov. 9, 1936   4 Sheets-Sheet 2

INVENTOR
Gwynne Raymond
BY
ATTORNEY

May 16, 1939.　　　　G. RAYMOND　　　　2,158,381
METERING APPARATUS
Filed Nov. 9, 1936　　　　4 Sheets-Sheet 3
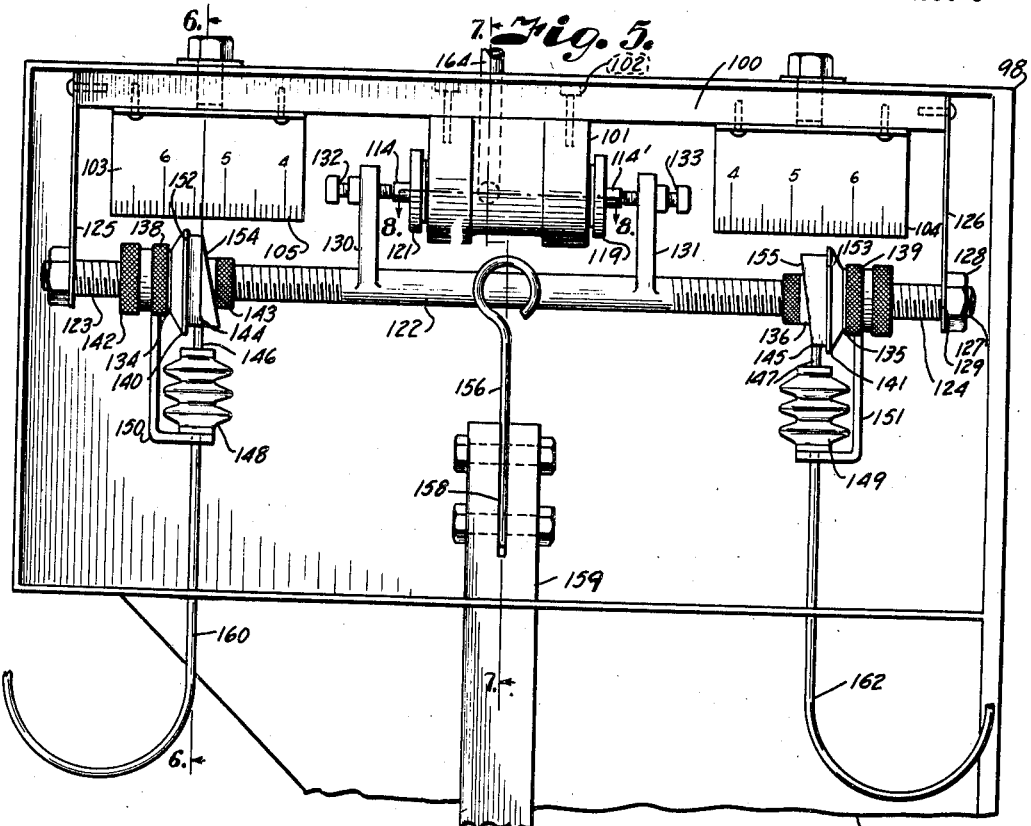
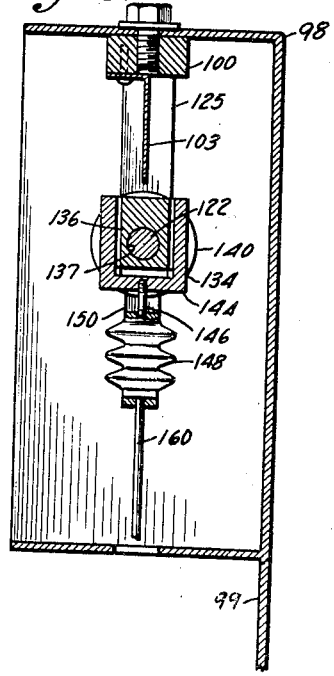
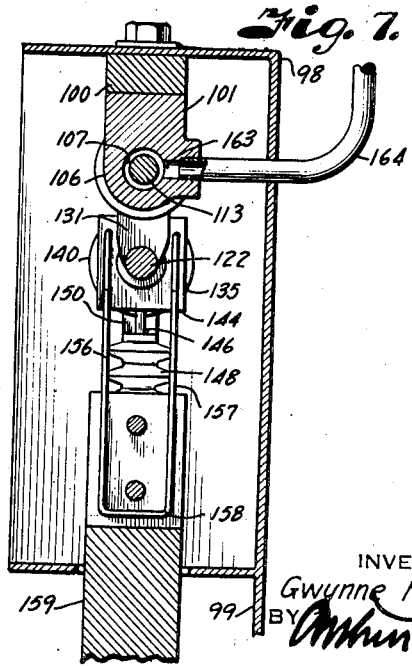
INVENTOR
Gwynne Raymond
BY
ATTORNEY May 16, 1939.　　　G. RAYMOND　　　2,158,381
METERING APPARATUS
Filed Nov. 9, 1936　　　4 Sheets-Sheet 4
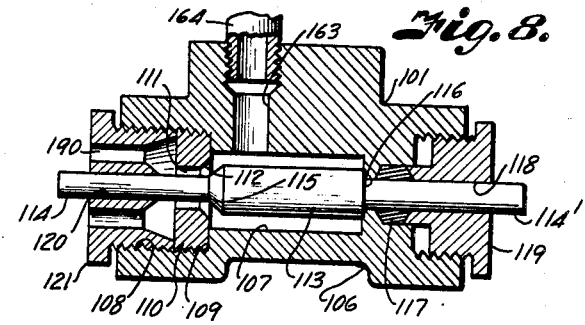
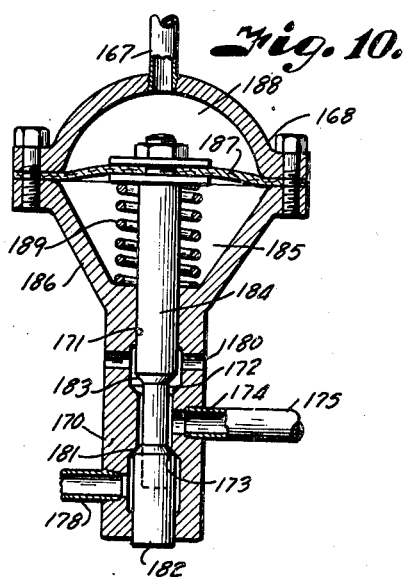
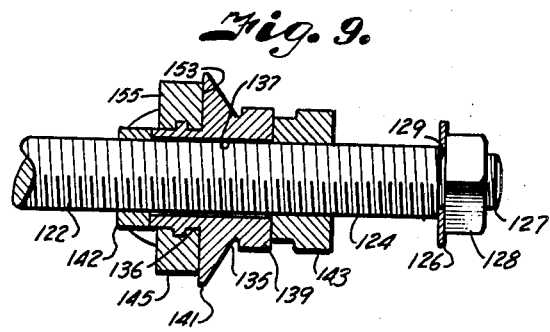
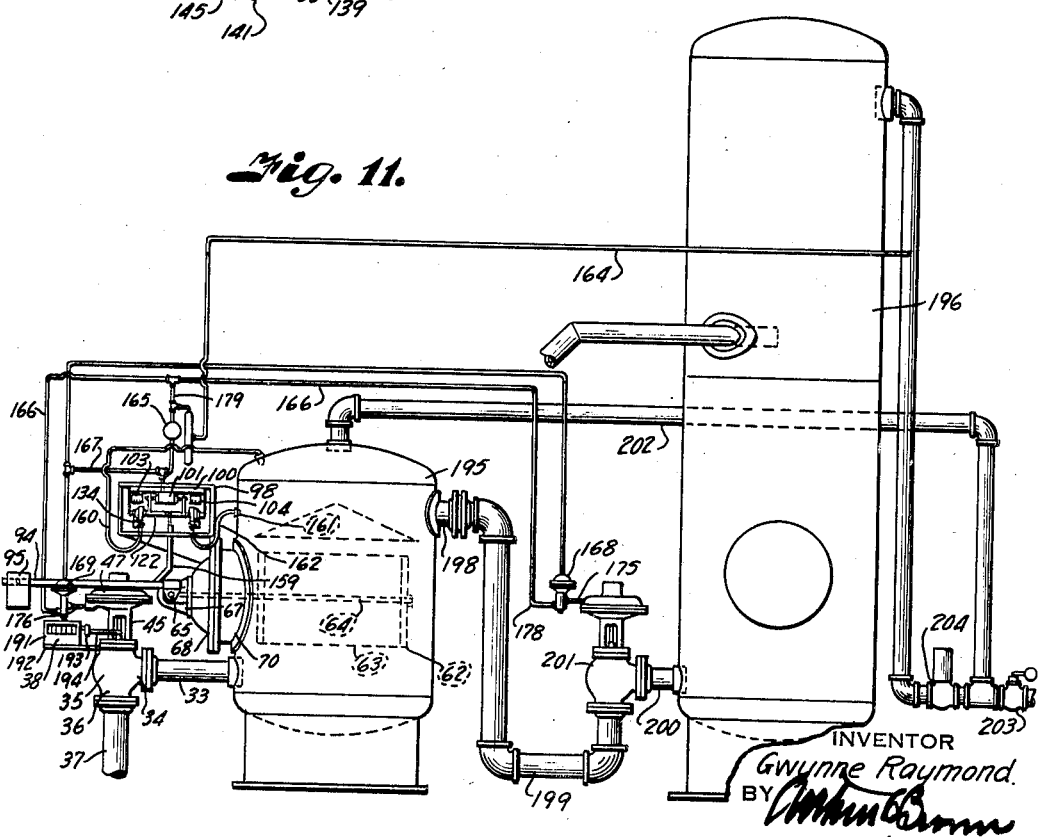
INVENTOR
Gwynne Raymond
BY
ATTORNEY Patented May 16, 1939

2,158,381

UNITED STATES PATENT OFFICE 2,158,381

METERING APPARATUS

Gwynne Raymond, Oklahoma City, Okla.

Application November 9, 1936, Serial No. 110,021

6 Claims. (Cl. 73—224)

This invention relates to metering apparatus particularly associated with an oil and gas separator or similar vessel, and has for its principal object to provide automatic mechanism for accurately measuring the volume of liquid discharged from the separator.

Other important objects of the invention are to provide a measuring apparatus which is of rugged and durable construction for operation at the high pressures and volumes of fluid handled in the present day separators; and to provide a metering apparatus constructed to compensate for changes of volume by reason of temperature and pressure changes within the separator.

In accomplishing these and other objects of the invention, as hereinafter pointed out, I have provided improved details of structure, the preferred forms of which are illustrated in the accompanying drawings, wherein:

Fig. 5 is an enlarged elevational view of the float tripped pilot valve for controlling flow of pressure medium to the inlet and dump valves that govern flow to and from the metering chamber.

Fig. 6 is a section on the line 6—6 of Fig. 5.

Fig. 7 is a section on the line 7—7 of Fig. 5.

Fig. 8 is an enlarged section through the pilot valve on the line 8—8 of Fig. 5.

Fig. 9 is a detail sectional view through one of the trip stops illustrating the wedge compensating for temperature and pressure changes.

Fig. 10 is a vertical section through one of the pilot valves.

Fig. 11 is an elevational view of a modified arrangement of metering apparatus wherein the metering receptacle is independent of the separator so that it is readily connectable to any existing separator unit.

Figure 1:
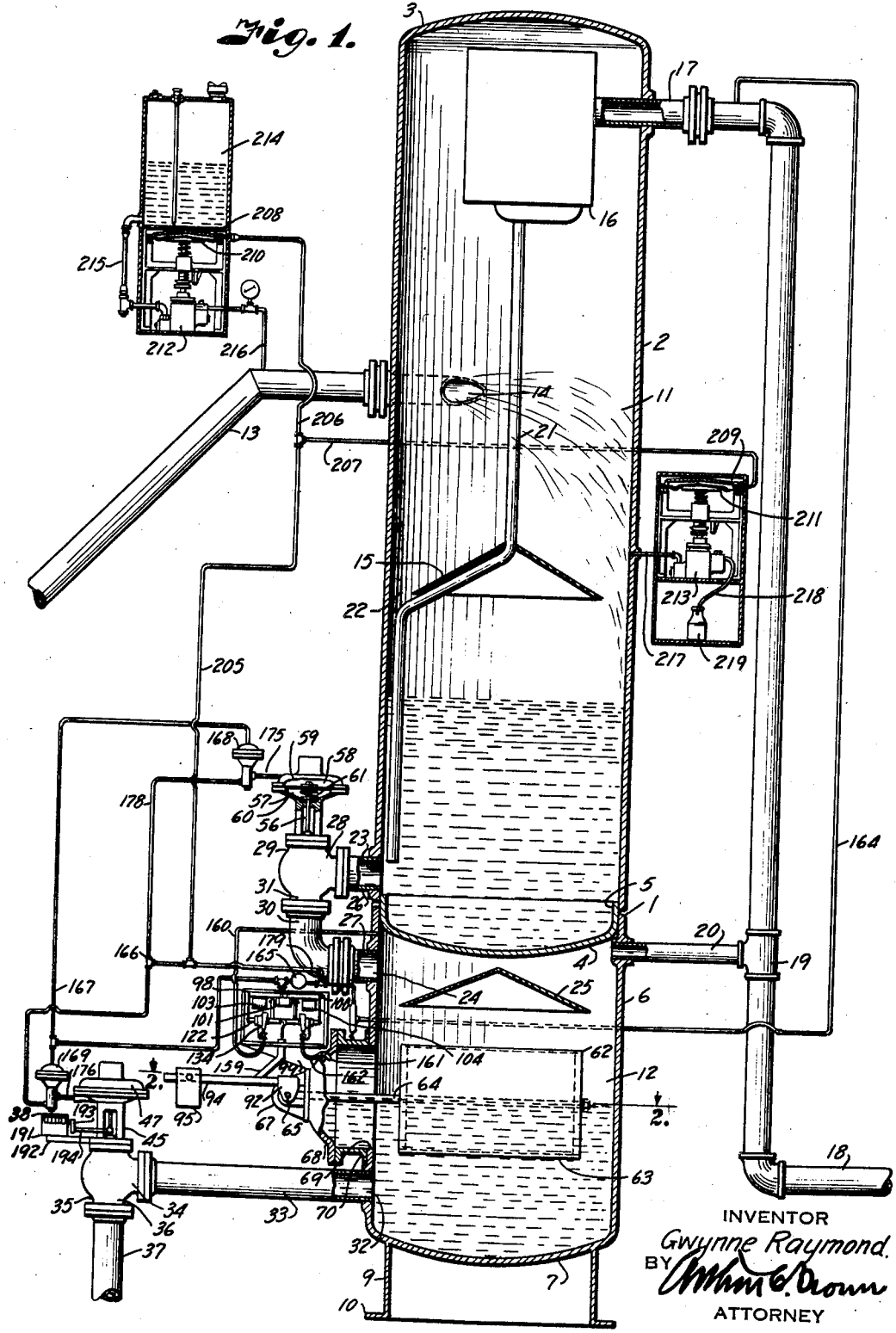
Fig. 1 is a vertical section through a flow metering apparatus incorporated in a liquid and gas separator constructed in accordance with the present invention.

Referring more in detail to the drawings:

1 designates a metering separator constructed in accordance with the present invention and which includes an upper annular wall 2 closed at its respective ends by heads 3 and 4. The head 4 is shown as having an annular flange 5 inset into the wall 2 and into the upper end of a lower annular wall 6 having its bottom closed by a head 7.

The vessel thus described is vertically supported on a ring-like base 8 welded to the head 7 and having a lateral flange 10 by which it is secured to a suitable foundation (not shown). The heads thus described are welded to the annular wall portions of the vessel to hold high pressures carried in the present day oil and gas separators, and the head 4 divides the vessel into an upper separating chamber 11 and a lower metering chamber 12.

The fluid to be separated is delivered tangentially of the chamber 11 at a point spaced below the head 3 through a flow line 13 connected with an inlet port 14 so that the discharge is swirled circumferentially about the inner surface of the chamber above a cone-shaped quieting baffle 15 to effect centrifugal separation of the gas and liquid contents of the flow. Upon separation, the gas moves upwardly toward the top of the separating chamber 11 and passes through a spray eliminator 16 for flow through a discharge line 17 extending from the eliminator through the wall of the vessel and thence downwardly along the side thereof to connect with a flow line 18 leading to a suitable source of disposal.

Located in the vertical portion of the discharge line at a point adjacent the upper end of the metering chamber is a T fitting 19 having connection with the metering chamber through a branch pipe 20 so as to effect equalization of pressures in the chambers 11 and 12.

The liquid collected in the spray eliminator drains to the bottom of the separator through a pipe 21 to collect with the separated liquid that flows downwardly through the passageway 22 encircling the quieting baffle 15. Provided in the side wall of the chamber 11 just above the bottom thereof is an outlet port 23 that connects with an inlet port 24 located in the wall 6 at a point above a quieting baffle 25 similar to the baffle 15, previously described, the ports 23 and 24 being provided with nipples 26 and 27 respectively connected with an inlet branch 28 of a control valve 29 and with an L fitting 30 that connects with the outlet branch 31 of the valve as clearly shown in Fig. 1. When the valve 29 is opened as later described liquid collecting in the bottom of the separating chamber flows by gravity into the metering chamber 12 because of equalization of pressures in the respective chambers through the gas discharge line 17 and branch 20.

The liquid upon flowing into the chamber is discharged over the quieting baffle 25 to flow from the periphery thereof to the bottom of the chamber 12 and out through a port 32 to which is connected a discharge pipe 33 connected with the inlet branch 34 of a control valve 35. The outlet branch 36 of the valve is connected with a discharge line 37 for conveying liquid to a storage tank, pipe line, or other source of disposal. The valves 29 and 35 are of similar construction but are arranged to act in reverse order, that is, when the valve 29 is opened to allow flow from the separating chamber 11 into the metering chamber 12, the valve 35 is closed so as to collect a predetermined quantity of liquid in the chamber 12, for example a standard unit or units of volume, such as a barrel; then when the given amount of liquid is accumulated in the chamber 12 the valve 29 is closed to shut off flow from the separator, and the valve 35 is opened to allow discharge of the unitary quantity of liquid that is accumulated in the chamber 12. It is thus obvious that by alternately operating the respective valves the liquid is discharged from the separating chamber in intermittent measured amounts so that the total flow of liquid is ascertained through a registering device 38 that is operably connected with the valve 35, regardless of the rate at which the liquid flows into the separating chamber.

Figure 4:
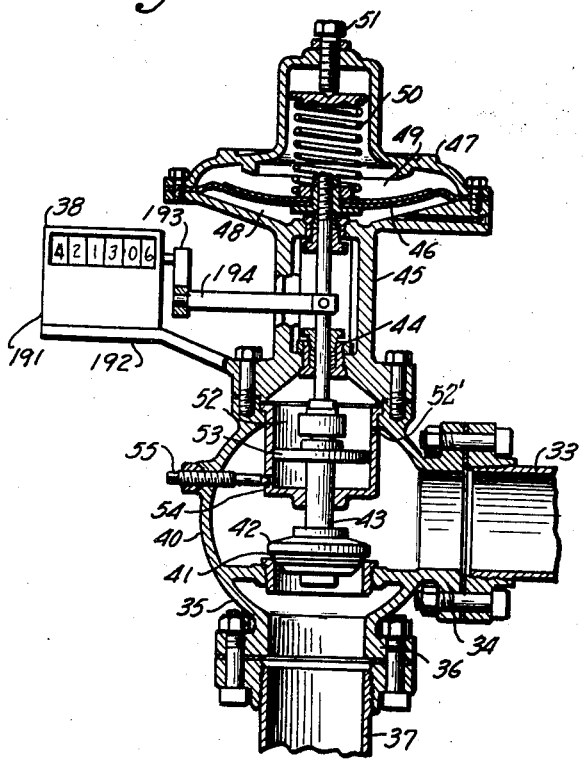
Fig. 4 is a vertical section through the pressure actuated outlet valve for dumping the liquid from the metering chamber.

Fig. 4 illustrates a section through the valve 35 which includes a housing 40 having a valve seat 41 located between the inlet and outlet branches of the valve. Operable on the seat 41 is a poppet type valve 42 having a stem 43 projecting through a stuffing box 44 in the valve bonnet 45 to connect with a pressure actuated diaphragm 46. The diaphragm 46 is carried in the diaphragm housing 47 formed as a part of the valve bonnet and is divided by the diaphragm into a pressure chamber 48 and a spring compartment 49. Located in the compartment 49 is a coil spring 50 having one end bearing against the diaphragm and its other against a plate backed by an adjusting screw 51 that is threaded into the housing for tensioning the spring sufficiently to normally retain the valve in seated condition. The valve stem extends through a check chamber 52 that is suspended within the valve housing to mount a piston 53 that is rigidly attached to the stem. Fluid is drawn from the valve housing into the check chamber and discharged therefrom through a port 54 having its effective area adjusted by a needle valve 55 threaded into the side wall of the valve housing so as to regulate the rate of flow for checking opening and closing movements of the valve. The chamber 52 above the piston 53 is vented to the interior of the casing 40 through a port 52' that is provided in the wall of the chamber.

The upper valve 29 is constructed to operate before the valve 35 so as to shut off flow from the separator before the liquid has started to discharge from the metering chamber. The valve 29 is also operated as quickly as possible and therefore the check chamber and piston are omitted. The valve stem 56 connects with a diaphragm 57 carried in a diaphragm chamber 58 mounted on the valve bonnet as shown in Fig. 1. The diaphragm, however, divides the housing into an upper pressure chamber and a lower spring compartment 59 and 60 respectively. Sleeved over the stem and having one end bearing under the diaphragm and its opposite end against the diaphragm housing is a coil spring 61 for normally retaining the valve in open position so that liquid can flow from the separating chamber into the metering chamber. In order to insure accuracy of the apparatus it is essential that the valves operate in proper sequence with the valve 29 opening and closing as rapidly as possible. Therefore the valve 29 is preferably provided with a spring as weak as practical and the tension of the spring for the valve 35 is tightened so as to provide the exact sequence of operation in response to the spring controlled actions of the respective valves.

Figure 2:
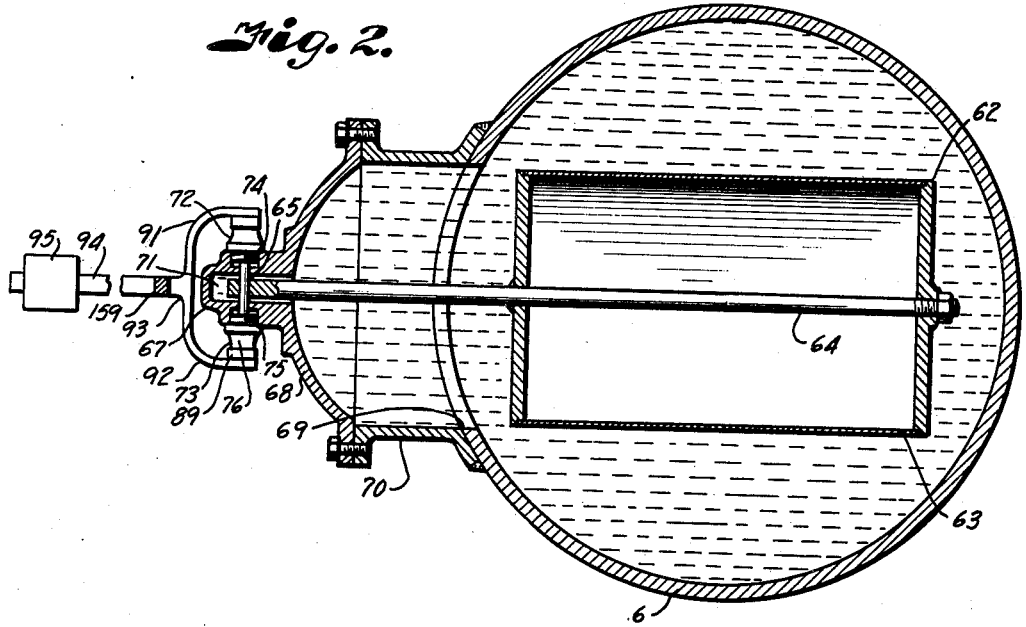
Fig. 2 is an enlarged cross-section through the metering chamber of the separator on the line 2—2 of Fig. 1.
Figure 3:
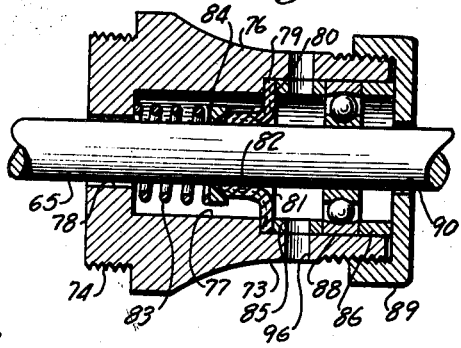
Fig. 3 is a detail section through one of the float arm stuffing boxes.

In order that the apparatus is automatic the unitary volume of liquid admitted to the metering chamber is under control of a float 62 that rises and falls with the level of the liquid and which effects operation of the valves when the liquid reaches a definite upper and lower level. For the sake of accuracy the float 62 is constructed to be as buoyant as possible and yet have sufficient strength to stand the normally high pressures carried in the separator. In the illustrated instance the float is shown as consisting of a hollow cylindrical body 63 mounted on an axial rod 64 extending through the float and having a projecting end fixed to a rock shaft 65 that is carried in an extension 67 of a manhole cover 68 closing an opening 69 in the wall 6 and through which the float is inserted into the metering chamber. The cover is secured to a flanged collar 70 that is welded about the opening as best shown in Fig. 2. The extension 67 has a recess 71 for accommodating the shaft end of the float rod. The shaft 65 has its ends rotatably mounted in bearing boxes 72 and 73 which are illustrated in detail in Fig. 3. The bearing boxes have threaded necks 74 that are mounted in threaded sockets 75 formed in the outer sides of the extension 67 and have bearing supporting portions 76 extending laterally therefrom. The bearing supporting portions 76 have bores 77 formed in axial alignment with openings 78 passing the ends of the rock shaft. The bores 77 have internal, annular shoulders 79 for seating the rim 80 of a cup-like packing 81 having an annular collar portion 82 encircling the shaft and urged into packing relation therewith by a coil spring 83 having one end bearing against the bottom of the bore and its other end against a washer 84 bearing on the packing portion of the ring as clearly shown in Fig. 3.

The packing is retained in seated engagement with the annular shoulder by a sleeve-like follower 85 pressed into the outer end of the bore and which cooperates with a similar follower sleeve 86 to retain an antifriction bearing 88 therebetween for supporting the shaft for free movement responsive to movements of the float. The packing assemblies including the antifriction bearings, are retained by caps 89 that are threaded onto the ends of the bearing housings and have central openings 90 to pass the ends of the rock shaft. Connected with the ends of the rock shaft are the arms 91 and 92 of a yoke 93 carrying an arm 94. Adjustably supported on the arm 94 is a balance weight 95 to substantially counterbalance the weight of the float. The bearing housing and followers 85 are provided with registering openings 96 to drain any leakage that may occur through the packings.

With the construction thus described it is obvious that the antifriction bearings are protected by the packing cups from the corrosive action and abrasion of sand contained in the liquid and therefore the float shaft is not likely to stick as would be the case if the bearings were mounted on the inner sides of the packing cups.

The float just described is used for actuating a primary control apparatus for admitting pressure medium to secondary valves which in turn admit a pressure medium to the respective pressure chambers of the diaphragm housings and for releasing the pressure medium to permit the valve springs to function as now to be described. The primary control is best illustrated in Figs. 5 to 9 inclusive, and is shown as including a box-like housing 98 that is supported on the manhole cover plate 68 by brackets 99. Carried on the inner side of the top wall of the housing is a plate 100 to which a primary valve 101 is secured by suitable fastening devices 102. Also attached to the plate 100 at opposite sides of the valve 101 are scales 103 and 104 having graduations 105 indicating the extent of movement of the float responsive to rise and fall of the liquid collecting in the metering chamber.

The valve proper is best illustrated in Fig. 8 and includes a body 106 provided with a valve chamber 107 opening inwardly from one end thereof which has an enlarged threaded recess 108 forming an annular seating shoulder 109 for a plate 110 having an exhaust port 111 encircled by a valve seat 112. Carried within the valve chamber is a cylindrical valve 113 having guide stems 114 and 114' projecting from the ends thereof. The end of the valve having the stem 114 is provided with a beveled face 115 to engage the seat 112 and close flow through the port 111. The stem 114' extends through a bearing opening 116, through a packing 117, and is guidingly supported in a bearing opening 118 of a packing nut 119 threaded into the valve body 106 for effecting seal of the packing. The stem 114 projects through the port 111 and is guidingly supported in a bearing opening 120 of a jam-nut 121 which is threaded into the body 106 for retaining the plate 110. The respective valve stems project from the valve body to be actuated by a reciprocating rod 122 under control of the float. The rod 122 has threaded ends 123 and 124 suspendingly supported from the ends of the plate 100 on flexible arms 125 and 126, the ends of the rod having reduced extensions 127 extending through suitable openings in the flexible arms, and being retained therein by nuts 128 threaded on the extensions to clamp the arms against the shoulders 129 formed at the reduced ends of the rod.

Carried by the rod adjacent the respective ends of the valve members are laterally extending arms 130 and 131 carrying adjusting screws 132 and 133 threadedly mounted in the arms and having their ends located in axial alignment with the projecting ends of the valve stems so that when the rod is shifted in one longitudinal direction the valve member 113 is caused to engage the seat 112 and when the rod is shifted in the opposite direction the valve is unseated. Mounted on the threaded ends of the rod are stop members 134 and 135 each including a substantially rectangular body portion 136 having a bore 137 for loosely receiving the ends of the rod (Fig. 9). The outer end of each rectangular portion 136 is provided with a knurled head 138 and 139 respectively carrying collars or pointers 140 and 141 that are movable under the respective scales 103 and 104. The stop members are normally retained in fixed position on the rod by the jam-nuts 142—143 engaging the opposite ends of the respective stops.

Variations of pressure and temperature within the metering and separator chambers affects the volume of oil dumped from the metering chamber, and to compensate for these effects I provide the stops with compensating members that are respectively operated incidental to pressure and temperature changes. These compensating members include wedge-like yokes or cams 144 and 145 that are slidably keyed to the stops and are connected with the actuating stems 146 and 147 of bellows 148 and 149 that are supported on L-shaped brackets 150 and 151 depending from the respective stop members. The outer sides of the yokes have flat faces 152—153 engaging against the pointer portions of the stop members and have inclined inner faces 154 and 155 adapted to be alternately engaged by the terminals 156 and 157 of a yoke 158 carried on the end of a lateral arm 159 fixed to the counterbalance arm 94. The bellows 148 is actuated responsive to pressure within the metering chamber transmitted through a tube 160 that is connected with the upper end of the chamber, and the bellows 149 is expanded and contracted by fluid contained in a bulb 161 supported by the manhole cover plate and which is connected with the bellows through a tube 162.

It is obvious that when the float rises in the metering chamber the terminals 156 and 157 engage against the inclined face 154 of the cam 144 to shift the rod 122, and that the extent of movement of the finger terminals before engaging the inclined faces is governed by the positions of the cams.

Communicating with the valve chamber 107 through a lateral port 163 is a pipe 164 leading from the gas discharge line 17, previously described, for supplying a pressure medium to the primary pilot valve through a pressure regulator 165 and through a pipe 166 and branch pipe 167 to secondary pilot or relay valves 168 and 169 which control supply of pressure medium to the valves 29 and 35 as now to be described. The secondary valves are of identical construction and are best illustrated in Fig. 10. They include a valve body 170 having a valve chamber 171 provided with valve seats 172 and 173 on opposite sides of a lateral port 174, connected by a pipe 175 in the instance of the valve 168 and by a pipe 176 in the instance of the valve 169 with the pressure chambers 48 and 58 of the valves 35 and 29 respectively. Pressure medium is supplied on the inlet side of the seat 173 through a pipe 178 that is connected with a pipe 179, which in turn is connected with the pipe 164 ahead of the regulator 165. The outlet side of the seat 172 connects with vent ports 180 wherethrough the pipe 175 is vented to atmosphere when the beveled face 181 of a valve member 182 is moved to engagement with the seat 173. The valve member 182 is reciprocably mounted in the valve body and also includes a beveled face 183 for engaging the seat 172 and has a projecting end 184 extending into a spring compartment 185 of a diaphragm housing 186. The diaphragm housing 186 is connected with the valve body and carries a diaphragm 187 having connection with the valve end 184 and which cooperates with the top portion of the diaphragm housing to form a pressure chamber 188 which connects with the pipe 167. The valve members 182 are normally retained in engagement with the seats 173 by coil springs 189 seated in the spring compartments and having their upper ends bearing against the diaphragms thereby normally holding the secondary pilot or relay valves in condition for venting the pressure chambers of the master valves.

When the float is down the primary valve 113 has been shifted from the seat 112 and the pressure medium is escaping through the port 111 and through the ports 190 of the jam-nut 121 so that the pressure cannot build up in the pressure chambers of the valves sufficiently to actuate the diaphragms of the secondary valves, but when the float has raised sufficiently to cause seating of the valve 113, then the pressure medium becomes effective and the pressure builds up in the diaphragm chambers to cause unseating of the valves 182 from the seats 173 which will admit the pressure medium to the main valves 29 and 35.

The metering device 38 previously mentioned consists of an ordinary counter 191 carried on an arm 192 of a housing for the valve 35. The actuating arm 193 of the counter is connected with an arm 194 fixed to the actuating stem of the valve 35 so that when the valve is opened the counter is operated to register the unit of liquid discharged from the metering chamber.

In the form of the invention illustrated in Fig. 11 the metering chamber 195 is a separate unit and adapted for connection with any existing type of separator 196, the chamber being provided by a tank having its inlet 198 connected by a line 199 with the discharge connection 200 of the separator, the valve 201 corresponding to the valve 29 in the preferred arrangement being interconnected into the line at a point adjacent the separator connection, otherwise the construction is identical to the preferred form of the invention. In this form of the invention, however, the metering chamber is connected by a pipe 202 with the gas off-take line 203 of the separator on the discharge side of a pressure reducing chamber 204 so that a higher pressure is maintained in the separator than in the metering chamber to effect flow of oil from the separating chamber into the metering chamber.

The primary pilot valve may also be used to render chemical injecting apparatus effective in injecting a charge of chemical into the flow line 13 upon each dumping of the metering chamber. Likewise a sampling apparatus may be operated for drawing samples of liquid from the separator. In these instances the pipe 179 is connected by a pipe 205 having branches 206 and 207 leading to diaphragm chambers 208 and 209 for acting on diaphragms 210 and 211 that are operably connected with the actuating stems of pumps 212 and 213. In the instance of the pump 212 chemical is drawn from a tank 214 through a pipe 215 and discharged into the flow line through a pipe 216. In the instance of the pump 213 a quantity of liquid is drawn from the separating chamber through a pipe 217 and discharged through a pipe 218 into a receptacle 219.

In using an apparatus constructed and assembled as described, the fluid to be separated, such as the flow from an oil well, is delivered to the separator through the line 13 and discharged tangentially therein to swirl about the inner wall of the chamber 11. The swirling action of the fluid effects centrifugal separation of the liquid and gas content thereof so that the gas rises in the chamber 11 and the liquid gravitates to collect in the bottom thereof. The gas passes through the spray eliminator 16 and is discharged through the pipe 17 into the line 18. When valve 29 is open a quantity of the separated liquid flows from the separating chamber into the metering chamber 12, and since the valve 35 is closed the liquid collects therein. As the liquid level rises the float 62 is raised to actuate the rock shaft 65, which in turn swings the counterbalance arm 94 and the lateral arm 159 in the direction of the stop member 134. The liquid continues to collect in the metering chamber until the terminals 156 and 157 engage the inclined face 154 of the wedge yoke or cam 144. When this occurs the rod 122 is shifted to the left (Fig. 5) by reason of the yieldability of the arms 125 and 126. This shifting movement of the rod causes similar shifting movement of the valve 113 incidental to engagement of the screw 133 to seat the valve 113 which stops flow of pressure medium from the exhaust port 111.

The pressure medium then becomes effective to build up sufficient pressure within the diaphragm chambers 188 of the secondary or relief valves to cause movement of the valve members 184 and engagement thereof with the seats 172. This movement of the valve members then allows flow of the pressure medium from the pipe 179 to the pipe 178 through the valve seat 173 and pipes 175 and 176 to the diaphragm chambers of the valves 29 and 35 respectively. Pressure medium then acts to effect seating of the valve 29 and unseating of the valve 35. When this occurs the accumulating liquid is retained in the separator and the unit charge of liquid in the metering chamber is discharged through the pipe 33 and valve 35 to the line 37. When the valve 35 is operated the stem thereof effects actuation of the counter to register discharge of the unit. The float moves downwardly with the lowering level of the liquid until the arms 156 and 157 of the yoke 158 engage the inclined face of the other cam element 145 to effect shifting of the rod 122 in the opposite direction and cause unseating of the valve 113. Pressure medium is then allowed to discharge through the ports 111 and 190 to cause sufficient drop in the diaphragm chambers of the secondary or relay valves so that the springs 189 come into play to seat the valves 182 on the seats 173 and to disengage the seats 172, thereby shutting off supply of pressure medium to the pipes 175 and 176 and allowing the diaphragm chambers of the valves 29 and 35 to exhaust through the pipes 175 and 176 and ports 180 of the respective relay valves. The springs 61 and 50 then come into play to open the valve 29 and seat the valve 35, thereby completing one cycle of operation. Flow is then reestablished between the separating chamber 11 and metering chamber 12 to admit another charge of separated liquid into the metering chamber.

Simultaneously with actuation of the valves 29 and 35 pressure medium is admitted through the pipe 205 and branch pipes 206 and 207 to the diaphragm chambers 208 and 209 for causing actuation of the pumps 212 and 213. Upon actuation of the pump 212 a charge of chemical is drawn from the tank 214 through the pipe 215 and discharged through the pipe 216 into the flow line 13 for treating the liquid collecting in the separator. When the pump 213 is operated a sample of liquid is drawn from the separator through the pipe 217 and discharged from a pipe 218 into a collecting receptacle 219.

When a change in temperature occurs within the separator the wedge-like cam member 145 is shifted by the bellows 149 to such a position that the inclined face thereof will compensate for change in the volume because of temperature. Because of greatly varying gas pressures in the separator, pressure on the liquid in the float chamber varies widely and any increase in pressure causes a more rapid flow from the float chamber, but change in pressures will act through the bellows 148 to adjust the cam 144 and thereby compensate for errors that would occur because of change in pressure in the respective chambers 11 and 12.

From the foregoing it is obvious that I have provided a metering apparatus which may be associated directly with a separator of the character described for measuring the volume of liquid discharged from the separator.

What I claim and desire to secure by Letters Patent is:

1. Apparatus of the character described including a metering chamber having inlet and outlet connections for liquid to be measured, inversely arranged valves controlling flow through said connections, means for actuating said valves responsive to predetermined maximum and minimum levels occurring in said chamber to effect isolated discharge of a unit volume of said liquid, means connected with said actuating means and responsive to temperature of the liquid to compensate for variation in volume incidental to temperature change of said liquid, and means connected with the actuating means and responsive to pressure within the metering chamber to compensate for variation in volume incidental to changes in pressure occurring in said chamber.

2. A metering mechanism for measuring liquid including a metering chamber having inlet and outlet connections for the liquid to be measured, inversely arranged valves respectively controlling flow through said connections, pressure actuated means for controlling said valves, a support associated with said metering chamber, a rod shiftable on the support, a valve body on the support having supply and exhaust ports, a valve member reciprocable in said body to close the exhaust port, spaced arms on said rod respectively engaging the ends of the valve member to shift the valve member for opening and closing the exhaust port, means supplying a pressure medium to the valve body, means connecting the valve body with said pressure actuated means, stop members adjustably mounted on said rod, a float in said metering chamber, and a lever arm connected with the float and arranged for alternately engaging said stop members to shift the rod in position for closing the exhaust port whereby said pressure medium is effective in actuating said pressure actuated means.

3. A metering mechanism for measuring liquid including a metering chamber having inlet and outlet connections for the liquid to be measured, inversely arranged valves respectively controlling flow through said connections, pressure actuated means for controlling said valves, a support associated with said metering chamber, a rod shiftable on the support, a valve body on the support having supply and exhaust ports, a valve member reciprocable in said body to close the exhaust port, spaced arms on said rod respectively engaging the ends of the valve member to shift the valve member for opening and closing the exhaust port, means supplying a pressure medium to the valve body, means connecting the valve body with said pressure actuated means, stop members adjustably mounted on said rod, a float in said metering chamber, a lever arm connected with the float and arranged for alternately engaging said stop members to shift the rod in position for closing the exhaust port whereby said pressure medium is effective in actuating said pressure actuated means, and temperature compensating means cooperating with one of said stop members to adjust the effective spacing of said stop members.

4. A metering mechanism for measuring liquid including a metering chamber having inlet and outlet connections for the liquid to be measured, inversely arranged valves respectively controlling flow through said connections, pressure actuated means for controlling said valves, a support associated with said metering chamber, a rod shiftable on the support, a valve body on the support having supply and exhaust ports, a valve member reciprocable in said body to close the exhaust port, spaced arms on said rod respectively engaging the ends of the valve member to shift the valve member for opening and closing the exhaust port, means supplying a pressure medium to the valve body, means connecting the valve body with said pressure actuated means, stop members adjustably mounted on said rod, a float in said metering chamber, a lever arm connected with the float and arranged for alternately engaging said stop members to shift the rod in position for closing the exhaust port whereby said pressure medium is effective in actuating said pressure actuated means, and compensating means cooperating with one of said members to adjust the effective spacing of said stop members to compensate for change in pressure surrounding said float.

5. A metering mechanism for measuring liquid including a metering chamber having inlet and outlet connections for the liquid to be measured, inversely arranged valves respectively controlling flow through said connections, pressure actuated means for controlling said valves, a support associated with said metering chamber, a rod shiftable on the support, a valve body on the support having supply and exhaust ports, a valve member reciprocable in said body to close the exhaust port, spaced arms on said rod respectively engaging the ends of the valve member to shift the valve member for opening and closing the exhaust port, means supplying a pressure medium to the valve body, means connecting the valve body with said pressure actuated means, stop members adjustably mounted on said rod, a float in said metering chamber, a lever arm connected with the float and arranged for alternately engaging said stop members to shift the rod in position for closing the exhaust port whereby said pressure medium is effective in actuating said pressure actuated means, temperature compensating means cooperating with one of said stop members to compensate for changes in temperature of liquid actuating said float, and compensating means cooperating with the other stop member to compensate for change in pressure surrounding said float.

6. A metering apparatus for measuring liquid in large volume and under high pressure including a metering chamber having means for the inlet and outlet of the liquid to be measured, valve means for alternately controlling flow of the liquid to and from the metering chamber, pressure operated means for actuating said valve means, a float in said chamber, pilot valve means, trip means operably connecting the float with the pilot valve means, conduit means connecting the pressure operated means with a high pressure gas supply, relay valve means in said conduit means, pressure operated means having connection with the relay valve means, gas conducting means connecting the gas supply with the pilot valve means and the pilot valve means with the pressure actuated means that is connected with the relay valve means, a pressure reducing valve in said gas conducting means to admit lower pressure gas to the relay valve means, the high pressure gas being admitted to the first named pressure actuated means to effect operation of said control valve means responsive to predetermined maximum and minimum levels of liquid in the metering chamber to periodically discharge predetermined unit volumes of liquid.

GWYNNE RAYMOND.